United States Patent
Bellada et al.

(10) Patent No.: US 11,685,551 B2
(45) Date of Patent: Jun. 27, 2023

(54) TOUCHLESS BAGGAGE DISPENSING

(71) Applicants: Goodrich Aerospace Services Private Limited, Bengaluru (IN); B/E Aerospace, Inc., Winston Salem, NC (US)

(72) Inventors: Mruthyunjaya S. Bellada, Bangalore (IN); Harish Udayakumar, Bangalore (IN)

(73) Assignee: B/E Aerospace, Inc., Winston Salem, NC (US)

( * ) Notice: Subject to any disclaimer, the term of this patent is extended or adjusted under 35 U.S.C. 154(b) by 0 days.

(21) Appl. No.: 17/468,320

(22) Filed: Sep. 7, 2021

(65) Prior Publication Data

US 2022/0081126 A1 Mar. 17, 2022

(30) Foreign Application Priority Data

Sep. 12, 2020 (IN) .............................. 202041039521

(51) Int. Cl.
*B64F 1/36* (2017.01)
*B65G 47/50* (2006.01)

(52) U.S. Cl.
CPC .............. *B64F 1/368* (2013.01); *B65G 47/50* (2013.01)

(58) Field of Classification Search
CPC .............. B64F 1/368; B64F 1/36; B65G 47/50
USPC .................................................. 198/358, 349
See application file for complete search history.

(56) References Cited

U.S. PATENT DOCUMENTS

| 9,315,278 | B2 | 4/2016 | Song et al. |
| 10,275,845 | B2 | 4/2019 | Mahfouz et al. |
| 10,336,555 | B1 | 7/2019 | Kurdi et al. |
| 2002/0040928 | A1 | 4/2002 | Jalili et al. |
| 2003/0085163 | A1 | 5/2003 | Chan et al. |
| 2010/0076796 | A1* | 3/2010 | Klein ............... G06Q 10/02 40/6 |

(Continued)

FOREIGN PATENT DOCUMENTS

| DE | 10040550 A1 | 3/2002 |
| EP | 3836055 * | 6/2021 ............... B64F 1/36 |

(Continued)

OTHER PUBLICATIONS

Extended European Search Report dated Feb. 4, 2022, issued during the prosecution of European Patent Application No. EP 21196414.3.

*Primary Examiner* — James R Bidwell
(74) *Attorney, Agent, or Firm* — Locke Lord LLP; Joshua L. Jones; Gabriella D'Angelo

(57) ABSTRACT

A method includes conveying baggage through a baggage claim system, receiving a code from a first passenger in a queue, and scanning codes on the baggage in the baggage claim system for a baggage item that matches with the code received from the first passenger. The method includes detecting the bagging item that matches with the code received from the first passenger and diverting the baggage item from the baggage conveyed through the baggage claim system for retrieval by the first passenger. This can be performed without the first passenger touching any of the baggage in the baggage claim system other than the baggage item that matches with the code received from the passenger, and without any other passengers touching the baggage item.

15 Claims, 2 Drawing Sheets

(56) References Cited

U.S. PATENT DOCUMENTS

| | | | | |
|---|---|---|---|---|
| 2011/0267192 A1* | 11/2011 | Goldman | ............ | G06Q 10/107 340/568.1 |
| 2012/0056723 A1* | 3/2012 | Zhu | ....................... | G06Q 10/08 340/10.1 |
| 2015/0197348 A1* | 7/2015 | Song | ....................... | B64F 1/368 235/375 |
| 2017/0362033 A1 | 12/2017 | Mahfouz et al. | | |
| 2019/0248512 A1 | 8/2019 | Lykkegaard | | |

FOREIGN PATENT DOCUMENTS

| | | | |
|---|---|---|---|
| GB | 2574061 | A | 11/2019 |
| KR | 101634501 | B1 | 7/2016 |

* cited by examiner

TOUCHLESS BAGGAGE DISPENSING

CROSS REFERENCE TO RELATED APPLICATIONS

This application claims the benefit of priority to Indian Patent Application No. IN 202041039521, filed Sep. 12, 2020. The entire contents of this application are incorporated herein by reference.

BACKGROUND

1. Field

The present disclosure relates to baggage handling, and more particularly to dispensing baggage such as at baggage claims in airports.

2. Description of Related Art

Typical baggage claims in airports include conveyor belts from which passengers manually remove their baggage. Many bags look alike, and it is common for a passenger to remove the wrong baggage by mistake. If the passenger realizes their mistake, they can replace the wrong baggage onto the conveyor and continue waiting for the correct baggage. However, in times of social distancing for suppressing epidemics, having other passengers touch the wrong baggage before the correct passenger retrieves the baggage is undesirable. In traditional systems, passengers may touch many bags before retrieving the correct one.

The conventional techniques have been considered satisfactory for their intended purpose. However, there is an ever present need for improved systems and methods for baggage dispensing. This disclosure provides a solution for this need.

SUMMARY

A method includes conveying baggage through a baggage claim system, receiving a code from a first passenger in a queue, and scanning codes on the baggage in the baggage claim system for a baggage item that matches with the code received from the first passenger. The method includes detecting the bagging item that matches with the code received from the first passenger and diverting the baggage item from the baggage conveyed through the baggage claim system for retrieval by the first passenger.

Conveying, receiving, scanning, detecting, and diverting can be performed without the first passenger touching any of the baggage in the baggage claim system other than the baggage item that matches with the code received from the passenger, and without any other passengers touching the baggage item. The method can include queueing passengers in the queue for baggage claim. Queueing passengers can include physically queueing the passengers in a queue conforming to social distancing protocol.

Diverting can include dropping a gate that diverts the baggage item off of a main conveyor and that then lifts to allow remaining baggage on the conveyor to continue along the conveyor. Receiving the code from the first passenger can include scanning a document containing the code presented by the passenger to the baggage claim system without the first passenger touching the baggage claim system.

After the first passenger retrieves the first baggage item the method can include repeating receiving a code, scanning codes on the baggage, detecting, and diverting for a second baggage item and a second passenger from the queue. Receiving a code, scanning codes on the baggage, detecting, and diverting can be repeated for each passenger in the queue and their respective baggage items. The passengers can all maintain social distancing while claiming their respective baggage items.

A baggage claim system includes a main conveyor for delivering baggage to passengers. A scanning system is positioned to scan codes on the baggage conveyed on the main conveyor. A scanner is operatively connected to the scanning system to receive a code from a passenger. A gate is operatively connected to the scanning system for selectively diverting baggage from the main conveyor for retrieval by passengers. The scanning system is configured to perform methods as described above.

A method of retrofitting a baggage claim system includes adding a gate to a main conveyor, wherein the gate is configured to divert individual baggage items from baggage conveyed on the main conveyor. The method of retrofitting includes adding a scanning system to the main conveyor and adding a scanner to the main conveyor operatively connected to the scanning system. The scanning system is configured to perform methods as described above.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
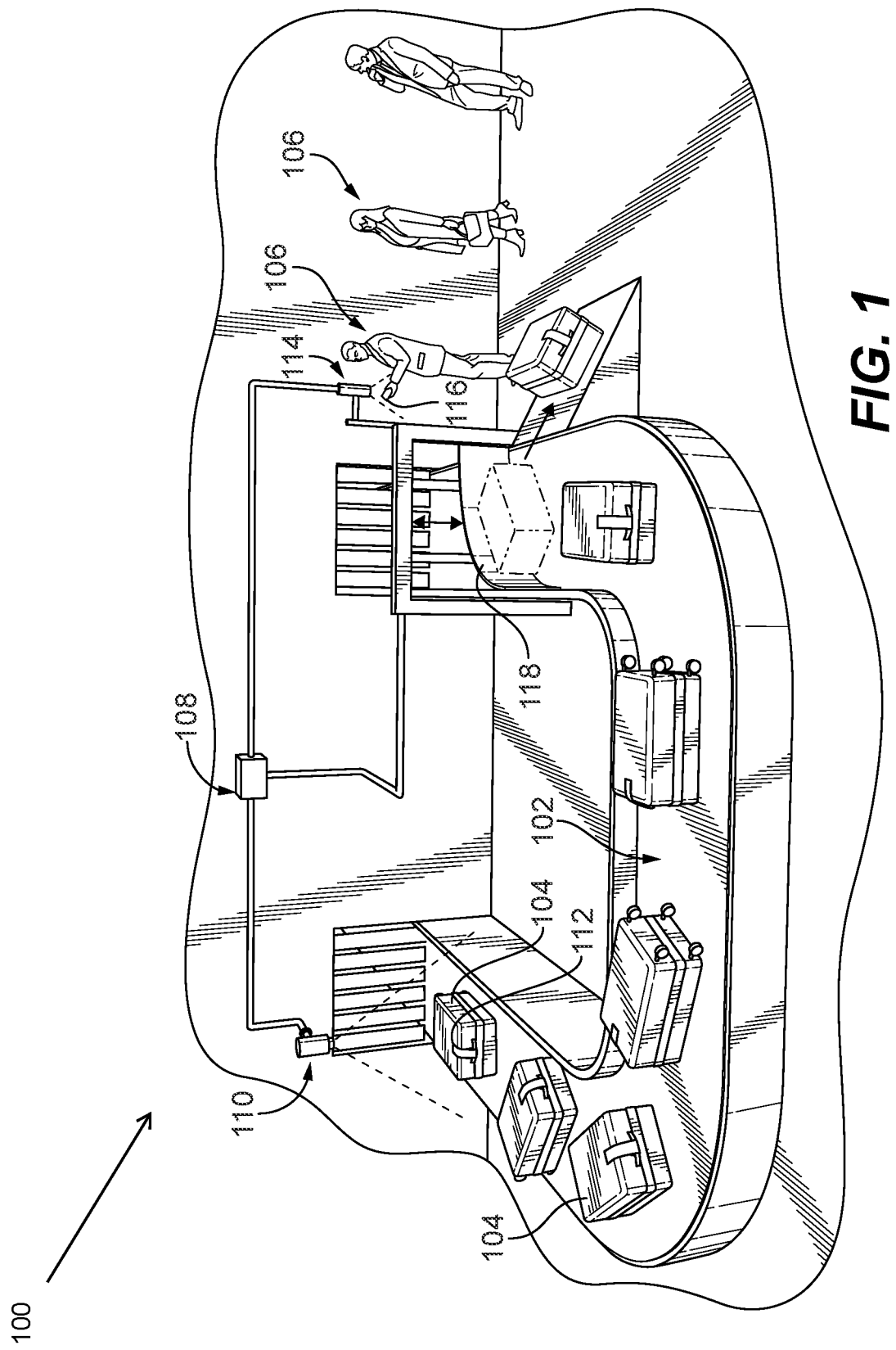
FIG. 1 is a schematic perspective view of an embodiment of a system constructed in accordance with the present disclosure, showing the main conveyor, scanning system, and gate for diverting baggage.

Reference will now be made to the drawings wherein like reference numerals identify similar structural features or aspects of the subject disclosure. For purposes of explanation and illustration, and not limitation, a partial view of an embodiment of a system in accordance with the disclosure is shown in FIG. 1 and is designated generally by reference character 100. Other embodiments of systems in accordance with the disclosure, or aspects thereof, are provided in FIG. 2, as will be described. The systems and methods described herein can be used to improve social distancing and reduce transmission of communicable diseases at baggage claims such as in arrival concourses in airports.

The baggage claim system 100 includes a main conveyor 102 for delivering baggage 104 to passengers 106. A scanning system 108 includes a scanner 110 that is positioned to scan codes 112, e.g. bar codes, on the baggage 104 conveyed on the main conveyor 102. A scanner 114 is operatively connected to the scanning system 108 to receive a code 116 from a passenger 106. The scanner 114 and code 116 can be configured for bar codes (e.g. in print or on a mobile device display), RFID codes, magnetic strip codes, or any other suitable type of code. The code 116 of the passenger 106 at the scanner 114 corresponds to the code 112 on the passenger's baggage item. A gate 118 is operatively connected to the scanning system 108 for selectively diverting baggage 104 from the main conveyor 102 for retrieval by passengers 106. The scanning system 108 is configured to perform methods as described herein.

It is contemplated that the baggage claim system 100 can be an original construction. It is also contemplated that a traditional baggage claim system can be retrofitted to produce the baggage claim system 100. A method of retrofitting a baggage claim system includes adding a gate, e.g. gate 118, to a main conveyor, e.g. main conveyor 102. The gate is configured to divert individual baggage items from baggage 104 conveyed on the main conveyor 102. The method of retrofitting includes adding a scanning system, e.g. scanning system 108, to the main conveyor 102 and adding a scanner, e.g. scanners 110, 114, to the main conveyor 102 operatively connected to the scanning system 108.

Figure 2:
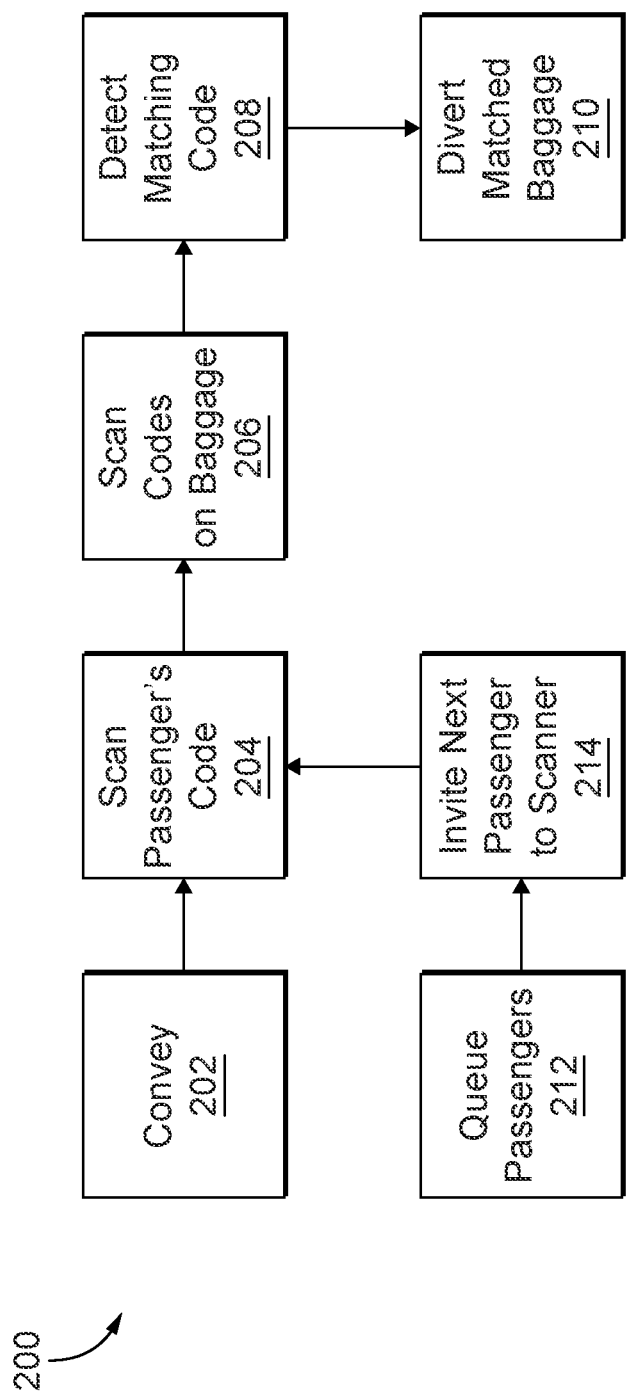
FIG. 2 is a diagram of a method that can be performed by the scanning system of FIG. 1.

With reference now to FIG. 2, a method 200 includes conveying baggage, e.g. baggage 104 in FIG. 1, through a baggage claim system, e.g. system 100 in FIG. 1, as indicated by box 202 in FIG. 2. The method includes receiving or scanning a code, e.g. code 116 in FIG. 1, from a first passenger 106 in a queue, as indicated in FIG. 2 by box 204. Receiving the code from the first passenger can include scanning a document containing the code presented by the passenger to the baggage claim system without the first passenger touching the baggage claim system.

The method also includes scanning codes, e.g. codes 112 in FIG. 1, on the baggage in the baggage claim system for a baggage item that matches with the code received from the first passenger, as indicated in FIG. 2 by box 206. The method includes detecting the bagging item that matches with the code received from the first passenger, as indicated in FIG. 2 with box 208.

The method includes diverting the baggage item from the baggage conveyed through the baggage claim system for retrieval by the first passenger, as indicated in box 210 in FIG. 2. Diverting can include dropping a gate that diverts the baggage item off of a main conveyor and that then lifts to allow remaining baggage on the conveyor to continue along the conveyor.

This process can be performed without the first passenger touching any of the baggage in the baggage claim system other than the baggage item that matches with the code received from the passenger, and without any other passengers touching the baggage item. The method can include queueing passengers in the queue for baggage claim, as indicated in box 212 in FIG. 2, and signaling or inviting the first passenger in the queue (the passenger who has reached the front of the line) to approach the scanner 114 in FIG. 1, as indicated by box 214 in FIG. 2. Queueing passengers can include physically queueing the passengers in a queue conforming to social distancing protocol, e.g. with marks on the floor or a wall for the passengers to que on wherein the marks are six feet apart. Every time a passenger retrieves their baggage item, the process can repeat for the next passenger. The passengers can all maintain social distancing while claiming their respective baggage items, and since they do not touch each other's baggage items, the baggage claim system 100 and method 200 help limit the spread of communicable diseases.

Systems and methods as disclosed herein provide potential benefits including the following. Existing luggage dispensing conveyor belt systems can be retrofitted with additional scanning systems installed. The baggage dispensing system can be touchless. The system can be mistake proof with an automated track, locate and dispense mechanism that avoids the wrong baggage being picked up. The systems and method can reduces the burden on the passenger to keep looking for their baggage. The process can be quick since it is can be an an automated mechanism without manual intervention.

The methods and systems of the present disclosure, as described above and shown in the drawings, provide for social distancing and reduced transmission of communicable diseases at baggage claims such as in arrival concourses in airports. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A method comprising:
   conveying baggage through a baggage claim system;
   receiving a code from a first passenger in a queue;
   scanning codes on the baggage in the baggage claim system for a baggage item that matches with the code received from the first passenger;
   detecting the baggage item that matches with the code received from the first passenger in response to receiving the code from the first passenger in the queue; and
   diverting the baggage item from the baggage conveyed through the baggage claim system for retrieval by the first passenger.

2. The method as recited in claim 1, wherein conveying, receiving, scanning, detecting, and diverting are performed without the first passenger touching any of the baggage in the baggage claim system other than the baggage item that matches with the code received from the passenger, and without any other passengers touching the baggage item.

3. The method as recited in claim 1, further comprising queueing passengers in the queue for baggage claim.

4. The method as recited in claim 3, wherein queueing passengers includes physically queueing the passengers in a queue conforming to social distancing protocol.

5. The method as recited in claim 1, wherein diverting includes dropping a gate that diverts the baggage item off of a main conveyor and that then lifts to allow remaining baggage on the conveyor to continue along the conveyor.

6. The method as recited in claim 1, wherein receiving the code from the first passenger includes scanning a document containing the code presented by the passenger to the baggage claim system without the first passenger touching the baggage claim system.

7. The method as recited in claim 1, wherein the baggage item is a first baggage item and further comprising after the first passenger retrieves the first baggage item:
   repeating receiving a code, scanning codes on the baggage, detecting, and diverting for a second baggage item and a second passenger from the queue.

8. The method as recited in claim 7, wherein receiving a code, scanning codes on the baggage, detecting, and diverting are repeated for each passenger in the queue and their respective baggage items.

9. The method as recited in claim 8, wherein the passengers all maintain social distancing while claiming their respective baggage items.

10. A baggage claim system comprising:
    a main conveyor for delivering baggage to passengers;
    a scanning system positioned to scan codes on the baggage conveyed on the main conveyor;

a scanner operatively connected to the scanning system to receive a code from a passenger; and a gate operatively connected to the scanning system for selectively diverting baggage from the main conveyor for retrieval by passengers, wherein the scanning system is configured to convey baggage on the main conveyor, receive the code from a passenger, scan the baggage on the main conveyor for a baggage item with a code that matches the code from the passenger, use the gate to divert the baggage item off of the main conveyor for retrieval by the passenger in response to receiving the code from the passenger, and move the gate to allow baggage on the main conveyor to resume movement on the main conveyor.

11. The system as recited in claim 10, wherein conveying, receiving, scanning, detecting, and diverting are performed without the passengers touching any of the baggage in the baggage claim system other than the baggage item that matches with the code received from the respective passenger, and without any other passengers touching other respective baggage items.

12. The system as recited in claim 10, wherein the scanning system is configured to queue passengers in a queue for baggage claim.

13. The system as recited in claim 10, wherein diverting includes dropping the gate that diverts the baggage item off of a main conveyor and that then lifts to allow remaining baggage on the conveyor to continue along the conveyor.

14. The system as recited in claim 10, wherein receiving the code from the passenger includes scanning a document containing the code presented by the passenger to the baggage claim system without the passenger touching the baggage claim system.

15. A method of retrofitting a baggage claim system comprising:

adding a gate to a main conveyor, wherein the gate is configured to divert individual baggage items from baggage conveyed on the main conveyor;

adding a scanning system to the main conveyor; and adding a scanner to the main conveyor operatively connected to the scanning system, wherein the scanning system is configured to convey baggage on the main conveyor, receive a code from a passenger, scan the baggage on the main conveyor for a baggage item with a code that matches the code from the passenger, use the gate to divert the baggage item off of the main conveyor for retrieval by the passenger in response receiving the code from the passenger, and move the gate to allow baggage on the main conveyor to resume movement on the main conveyor.

* * * * *